United States Patent [19]

Buscher

[11] 4,012,143
[45] Mar. 15, 1977

[54] MULTI-AXIS LASER SCANNER
[75] Inventor: David J. Buscher, Silver Spring, Md.
[73] Assignee: The United States of America as represented by the Secretary of the Army, Washington, D.C.
[22] Filed: Oct. 10, 1975
[21] Appl. No.: 621,320
[52] U.S. Cl. .................... 356/71; 250/559; 250/571; 356/203
[51] Int. Cl.$^2$ .......................... G06K 9/08
[58] Field of Search ........... 356/71, 203; 250/556, 250/557, 566, 571, 559

[56] References Cited
UNITED STATES PATENTS

| 3,768,913 | 10/1973 | Klimecki | 356/203 |
| 3,818,190 | 6/1974 | Silverman et al. | 356/71 |

Primary Examiner—Vincent P. McGraw
Attorney, Agent, or Firm—Nathan Edelberg; Robert P. Gibson; Saul Elbaum

[57] ABSTRACT

A multi-axis scanning technique and system for achieving same are provided for digitizing micro-documentation with a pulsed laser beam scanner. Micro-documentation such as a 35mm aperture card reduction of an E-size engineering drawing is incrementally advanced into the path of the scanner and each incremental area is scanned in a predetermined sequence of discrete areas. These discrete areas provide data which is subject to vector and area compaction techniques.

8 Claims, 7 Drawing Figures

MULTI-AXIS LASER SCANNER

RIGHTS OF THE GOVERNMENT

The invention described herein may be manufactured, used, and licensed by or for the United States Government for governmental purposes without the payment to us of any royalty thereon.

FIELD OF THE INVENTION

This invention relates to micro-documentation scanners for achieving data compaction in high resolution scanning.

BACKGROUND OF THE INVENTION

In the scanning of micro-documentation, such as aperture cards, to produce digital data from which the document can be reproduced with a sufficiently high degree of resolution, a typical aperture card may require approximately 80,000,000 discrete scan points to achieve the proper visual resolution. This number of bits would be required, for example, to scan an E-size engineering drawing reduced to a 35mm film size aperture card and store digitized reproductive data for same.

This magnitude of data bits, however, is too much data to store or handle efficiently and must be compacted, preferably before such data is translated to a data base.

Currently, such high resolution scanners scan on a line-by-line raster basis and the compaction methods for the resultant data are limited by this technique. For the typical aperture card identified above, for example, the data compaction ratio will be on the order of 50 to 100 to 1. To make such a scanner system practical the data compaction ratio should be on the order of 500 to 1000 to 1.

OBJECTS OF THE INVENTION

It is, therefore, an object of the present invention to provide a new and novel high resolution scanning means and scanning technique for aperture cards or the like which are capable of effecting data compaction ratios on the order of 500 to 1000 to 1.

Another object of the present invention is to provide a new and novel multi-axis laser scanning means and scanning technique which effects a multi-area scan of a given surface area to provide digitized data which is compactible by vector compaction and pattern recognition techniques.

These and other objects of the present invention will become more fully apparent with reference to the following specification and drawings which relate to a preferred embodiment of the invention.

SUMMARY OF THE INVENTION

A multi-axis laser scanner utilizing orthogonally disposed multi-faceted scanning mirrors is positioned adjacent to an aperture card holding station in which a given aperture card to be scanned is positioned for incremental advancement in the path of the laser scanning raster generated by the said mirrors. Each advancement of the aperture card exposes a plurality of discrete scanning areas to the scanning raster and each of said areas are scanned one-by-one until all area scans have been completed, whereupon the aperture card is incremented to the next scan position.

The pulsed laser beam passes through the aperture card and the data is detected by a diode detector array on the opposite side of the aperture card in the path of the laser. The output of the diode detector array is digitized and fed into a buffer register having a capacity at least twice that of a digitized discrete area data stream such that compaction of the data for a first discrete area may be completed while the next area is being scanned. The data buffer transmits data to a matrix oriented vector compiler or other suitable matrix oriented data compactor. The entire system is synchronously operated by suitable clock and controller devices.

DETAILED DESCRIPTION OF THE INVENTION

Figure 1:
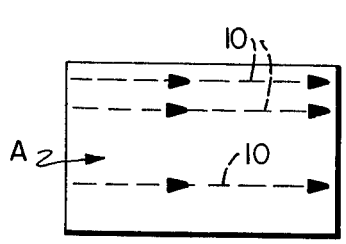
FIG. 1 is a schematic representation of a prior art line-by-line scanning raster.

Referring in detail to the drawings and with particular reference to FIG. 1 the conventional scanning method of the prior art is illustrated over an area A in which a plurality of horizontal scan lines 10 having a data density of 10,000 points per line are utilized to effect a data scan of the entire surface. Each scan point constitutes a pulse emitted from a scanning laser as will be more fully described hereinafter.

Figure 2:
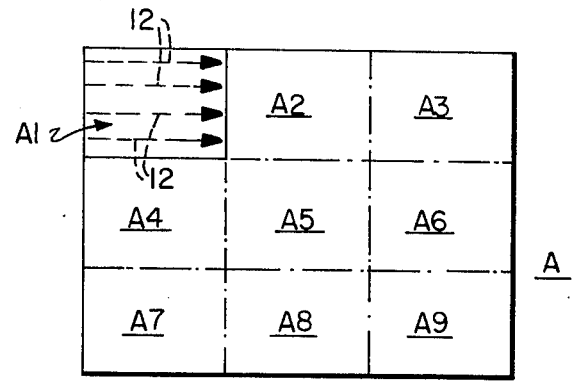
FIG. 2 is a schematic representation of an area-by-area scan of the present invention.

The basic scanning concept of the present invention is illustrated in FIG. 2 to which reference is now made in which the area A is divided into a plurality of discrete areas A1 - - - AN (where N=9 by way of example) where a like data density of 10,000 for each discrete area can be accomplished by 100 scan lines having 100 data points in each line.

Such a discrete area scan will allow vector compression techniques to be used without increasing the amount of digital data required by the line-by-line scan. Furthermore, there is a higher probability that discrete areas will be empty of data than that prior art scan lines will be empty of data, thus enhancing the compaction function.

Figure 3:
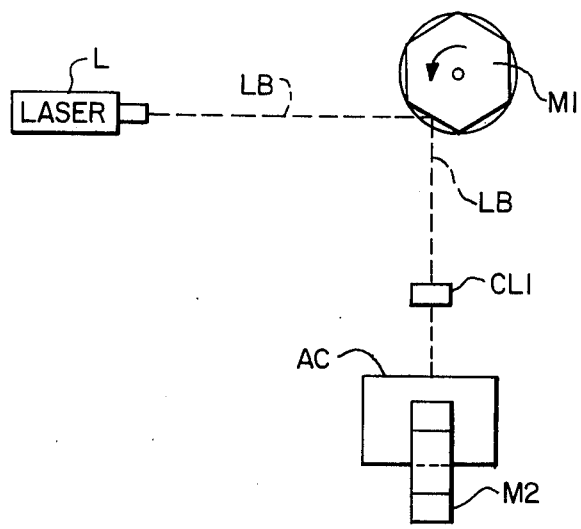
FIG. 3 is a schematic top plan view of a multiaxis laser scanner of the present invention.
Figure 4:
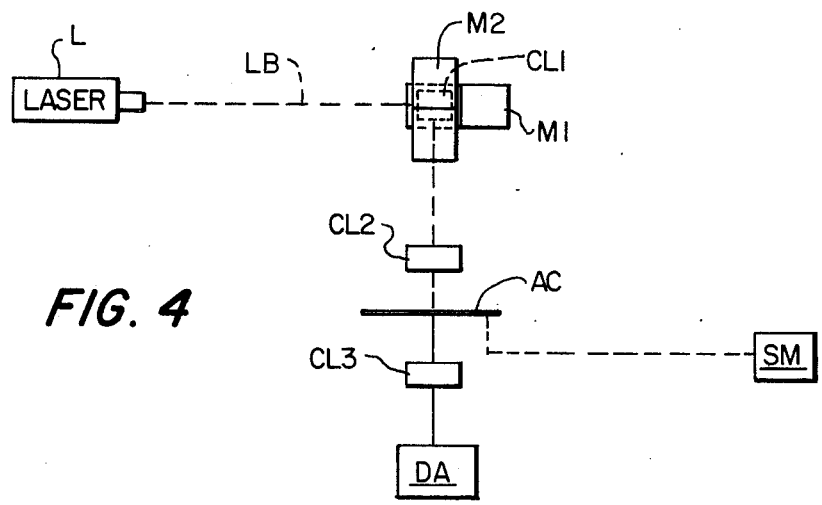
FIG. 4 is a side or front elevation of FIG. 3.

Referring to FIGS. 3 and 4, the scan hardware of the present invention is shown as including a laser L emitting a laser beam LB at a predetermined pulse rate.

The laser beam LB impinges on a first multi-facet spinning mirror M1 from which it is reflected through a first collimating lens CL1 onto one of the surface facets of a second spinning multi-facet miror 2 having its axis of rotation orthogonally disposed to that of the first mirror M1.

An aperture card AC having information to be scanned mounted therein is positioned relative to the second mirror M2 such that the laser beam LB will be reflected from the said second mirror M2 through the data portion of the aperture card AC normal to the plane of the latter.

A second collimating lens CL2 is positioned between the second mirror M2 and the aperture card AC to maintain optimum definition and direction of the reflected laser beam LB.

Behind the aperture card and in the path of the laser beam LB passing therethrough is a third collimating lens CL3 through which the laser beam, with its intensity modified by any data in its path, passes and subsequently impinges on an optical diode detector array DA comprising a detector matrix for the discrete area of the aperture card being scanned.

Figure 5:
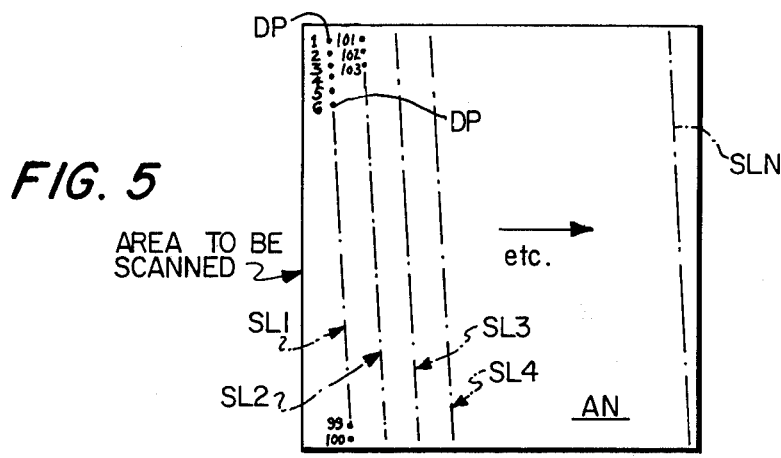
FIG. 5 is a detailed representation of a discrete area scanning raster of the present invention.

The rotation of the two multi-facet mirrors M1 and M2 at properly selected relative speeds results in an area scan of the type shown in FIG. 5. The pulsed laser beam LB is reflected from the first mirror M1 to produce a scan line. This scan line is reflected from the second orthogonally disposed mirror M2 through the aperture card AC and detected by the diode array DA.

The synchronization of mirror speeds and laser pulses will result in the scan pattern of scan lines SL1 – – – SLN over a discrete scan area AN as shown in FIG. 5. If the pulses from the laser L are numbered on a first generated basis then the data points DP will be numbered as shown in FIG. 5, commencing at the top left hand corner of the area AN and proceeding downward for, say, 100 data points DP in the scan line SL1, with the second scan line SL2 commencing with data point number 101.

There will be some skew in the scan lines SL1 – – – SLN as shown but this can be minimized by adjusting the speed of the second mirror M2 or by driving the latter with a stepping motor.

The aperture card AC of FIG. 4 is shown schematically as being driven by a stepping motor SM to present an incremental area of a predetermined order of magnitude between the second mirror M2 and the diode array DA where each incremental those discrete area is subjected to the multi-area scan (pattern of discrete areas AL – – – AN) defined above with reference to FIGS. 2 and 5.

In order to achieve proper correlation of the data produced by the various discrete area scans, full synchronization of the digital data and the several control functions used to achieve the scan must be accomplished. A suitable control system 20 for such synchronization will now be described with reference to FIG. 6.

The laser L, laser beam LB and diode detector array DA are shown in their previously described configuration with the diode array DA shown as having an output DA1 driving an input of digitizing circuitry DC of any suitable type known in the art.

A system clock SC is provided to synchronize the entire control circuit 20 and has a first clock output SC1 driving a mirror motor synchronizer MMS and a second clock output SC2 driving a central processing unit or controller module CM.

The controller module CM is connected by a first bi-directional control bus CM1 to the stepper motor SM to control and monitor the incremental advance of the aperture card AC of FIGS. 3 and 4.

A second bi-directional control bus CM2 interconnects the controller module CM with the data digitizing circuitry DC to synchronize and control the functioning of that circuit; a third bi-directional control bus CM3 interconnects the controller module CM with a matrix oriented vector compiler VC or other appropriate matrix oriented or pattern recognition data compactor means; a fourth bi-directional control bus CM4 interconnects the controller module CM with an area counter circuit ACC; and a fifth bi-directional control bus CM5 interconnects the controller module CM with a scan counter circuit SCC which is preferably of the circular counter type.

Control signal inputs are applied to the controller module CM from a start scan detector circuit SD via a first control input bus SD1; from a stop scan detector circuit SE through a second control input bus SE1; and from a start/stop row area scan circuit SR through a third control input bus SR1.

The digitizing circuit DC has a digitized data output DC1 which drives a data buffer register DBR, the latter having a bi-directional output bus DBR1 presenting the stream of digitized data stored therein to the data input of the data compaction means, namely, the vector compiler VC.

The vector and area compiler VC operates on the data received from the data buffer register DBR to compact the same by known techniques and presents a stream of compacted data on a data output bus DO. The data may also undergo pattern recognition schemes to further compact the data.

The first and second rotating mirrors M1 and M2 of FIG. 3 are driven by first and second mirror motors MM1 and MM2, respectively, which are synchronized through control output leads MMS1 and MMS2, respectively, from the motor synchronizer circuit MMS as controlled by the system clock SC. Appropriate speed ratios between the mirror motors MM1 and MM2 are provided by any suitable proportionate timing means known in the art.

Figure 7:
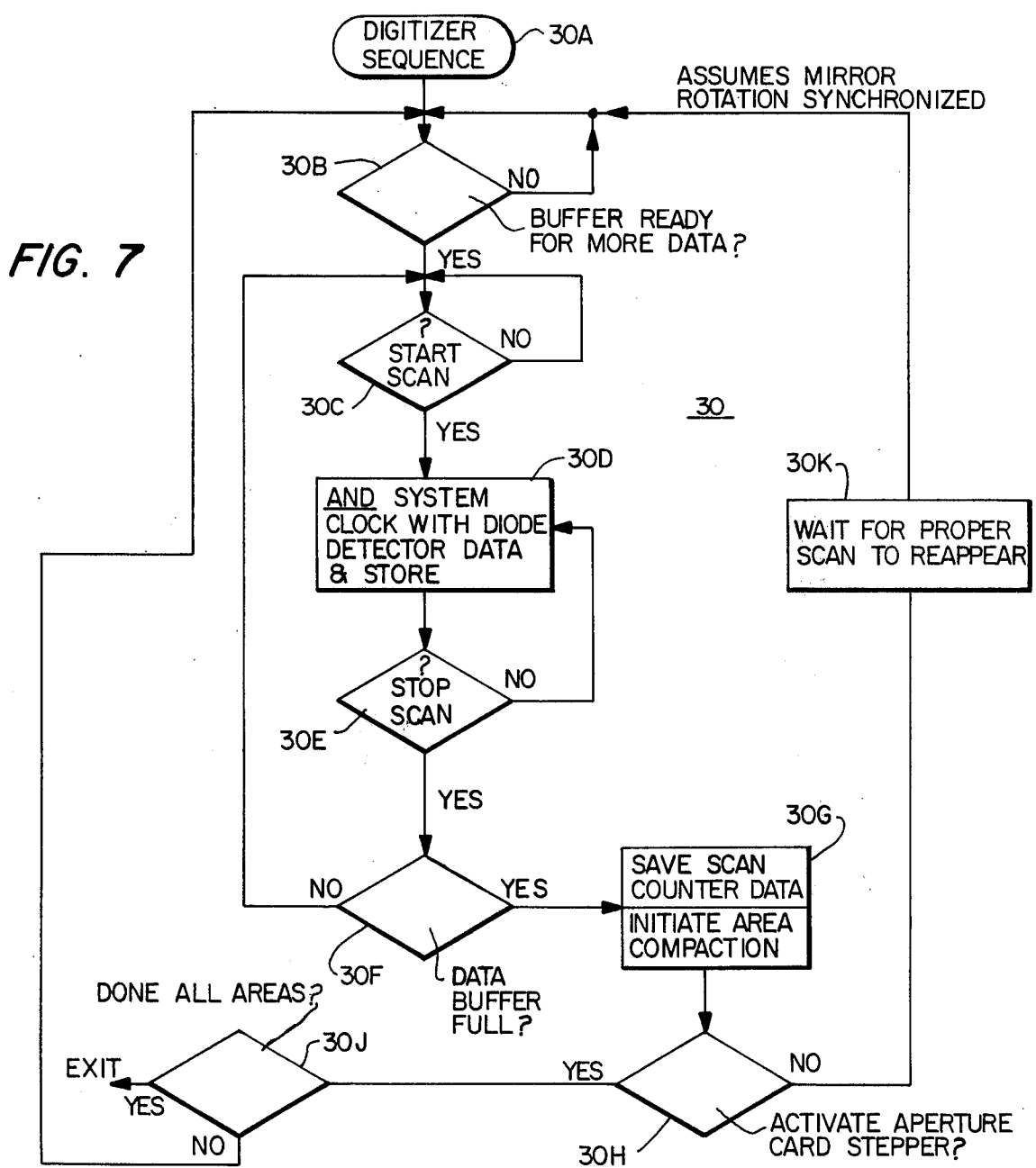
FIG. 7 is a control sequence flow chart of the present invention.
Figure 6:
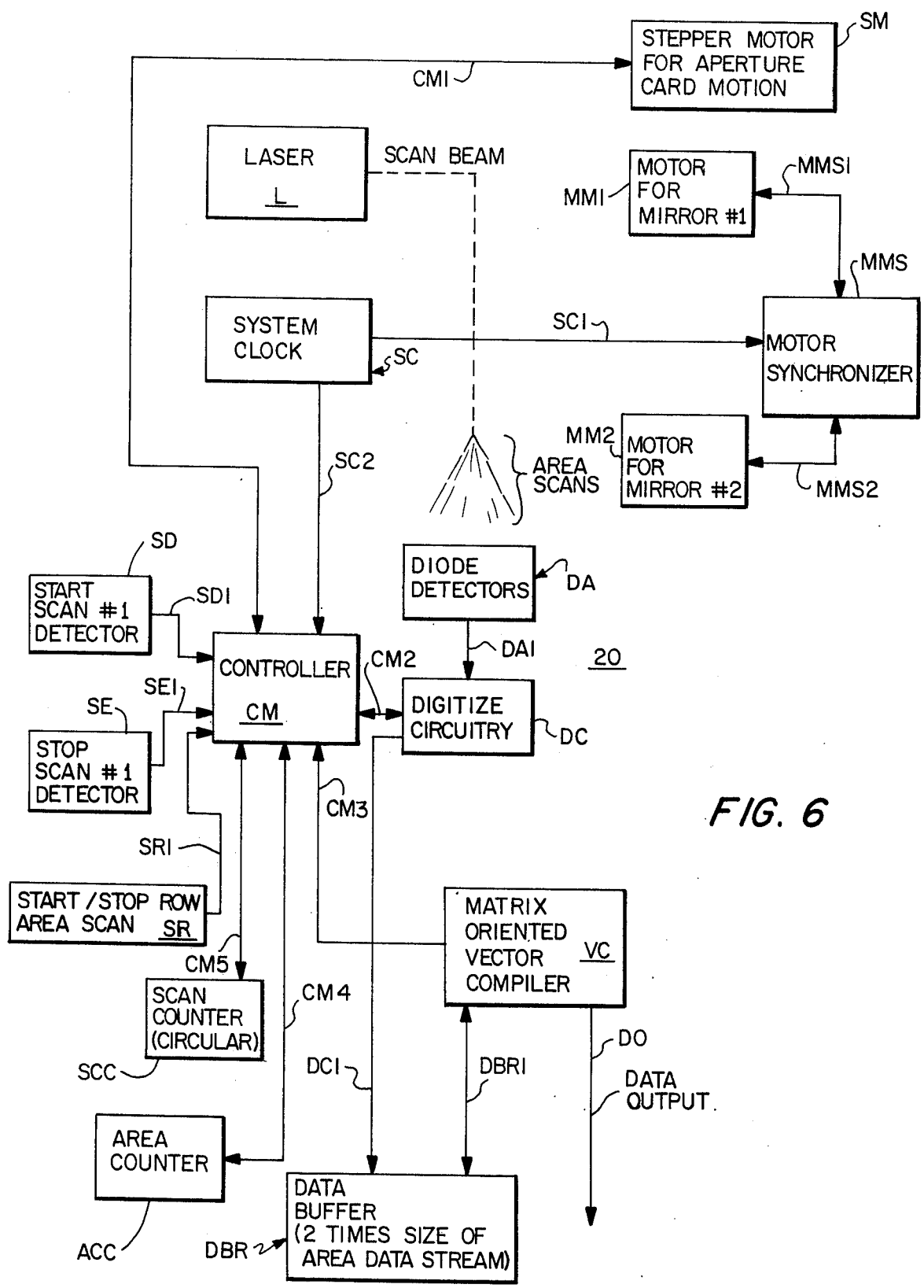
FIG. 6 is block diagram of a scan control system of the present invention.

The flow diagram 30 for the programmed control sequence of the control system 20 of FIG. 6 is illustrated in FIG. 7 as achieved by the controller module CM.

As shown by block 30A the control loop of the flow diagram 30 is entered by the digitizer sequence from the digitizing circuitry DC and the state of the data buffer register DBR is examined (block 30B) to determine if the latter is ready to receive more data from the digitizing circuitry DC. If "NO" the loop 30 is re-entered and if "YES" inquiry is made (block 30C) as to whether or not to start an area scan.

If "NO" the inquiry is repeated, If "YES", the instruction is generated in the block 30D to AND the system clock SC with the data from the diode detector array DA and the digitizer circuitry DC and data buffer DBR are coordinated to effect digitizing and storage, respectively, of the data detected by the detector array DA.

This process continues until a stop scan signal is generated as illustrated by the block 30E, in which a "YES" results in an inquiry (block 30F) as to whether the data buffer register is full. If "NO", the scan is restarted by entry of the instruction block 30C. If "YES", the fully loaded condition of the data buffer register DBR requires that the data in the scan counter SCC be preserved and that the vector compiler VC be enabled to receive the data from the buffer register DBR as illustrated in the instruction block 30G.

When all of the discrete scan areas A1 – – – AN of a given incremental scanning area have been actuated, the instructions jump from the data compaction routine to instruct the stepping motor SM to increment the aperture card (instruction block 30H) and inquire as to whether all incremental areas on the aperture card AC have been fully scanned. If "YES", the control loop 30 is exited and the scanning and data compaction is complete for that aperture card. If "NO" the instruction block 30B is re-entered and the program recycles.

In the instruction block 30H if the answer is NO to activating the aperture card stepper motor SM, the instruction block 30K is entered to await the proper scan index to reappear to synchronize the ultimate acceptance of data by the buffer register DBR with the proper discrete area scan to maintain the stream of data in proper correlation with the scan sequence.

OPERATION

To summarize the operation of the scanning system of the present invention, assuming proper synchronization of the mirrors M1 and M2, as the aperture card AC is scanned the digitized data from the digitizing circuitry DC is synchronously stored in the data buffer register DBR, and when the latter is full, the data compaction process commences in the vector compiler VC.

Since this compaction process takes a finite amount of time the mirrors M1,M2 will continue to rotate and the aperture card AC will continue to be scanned by the laser beam LB. If double buffering is used in the buffer register DBR, then data may be stored therein during compaction of previously received data.

If, however, the system is forced to wait to take on more data in the data buffer register DBR because of required lead time in the vector compiler VC, then data synchronization is lost and must be re-established. This is achieved by storing the count of the scan counter SCC at this point in time and awaiting the recycling of that counter to the same count (instruction block 30K) at which time the collection of data by the data buffer register DBR is permitted to resume.

Once all the areas AL - - - AN for a particular incremental position of the aperture card AC have been scanned, as determined by the area counter ACC and instruction block 30J, the stepper motor SM is enabled by the controller module CM through the first bi-directional control bus CM1 to increment the aperture card AC to its next scan position where the scans of areas AL - - - AN will be repeated for that position.

Once all of the incremental scanning positions of the aperture card AC have been scanned (instruction block 30J) the program is completed.

By scanning discrete areas rather than an entire area on a line-by-line basis, advantage is taken of the higher probability that more discrete areas on the aperture card AC will be found with no data therein than continuous scan lines with no data.

With the discrete area scan of the present invention, the prime components of the drawing data to be scanned can be approximated by vector segments which tend to be randomly oriented rather than lying along established scan lines, thus permitting vector coordinate definition of data rather than point-by-point definition, and materially reducing the amount of data required to reproduce the drawing from stored and compacted digitized data.

Furthermore, once individual areas have been scanned, the composite situation of surrounding scan areas can be considered by known recursive compacting techniques to ascertain which vectors pass through more than one discrete area, thus further reducing the volume of data required and achieving further compaction of the data stream resulting from the discrete area scanning method of the present invention.

I wish it to be understood that I do not desire to be limited to the exact details of construction shown and described, for obvious modifications can be made by a person skilled in the art.

What is claimed is:

1. A multi-axis laser scanner for generating and compacting digital data from information recorded on a surface area, comprising:
   laser means providing a pulsed laser beam;
   first and second multi-faceted rotating mirror means in the path of said laser beam on orthogonally disposed first and second axes of rotation, respectively, for mutually reflecting said laser beam in a scanning raster;
   control means for said mirror means constraining said mirror means to direct said laser beam scanning raster over a predetermined pattern of discrete areas;
   information means having an information containing surface comprising a major information area consisting of a plurality of incremental information areas each definable by said predetermined pattern of discrete areas;
   feed means for said information means sequentially presenting each of said plurality of incremental areas into the path of said laser beam to be scanned by said raster in said predetermined pattern of discrete areas;
   detecting and digitizing means responsive to the interaction of said scanning raster and said information surface providing a plurality of discrete digital data streams representative of the information on said major information area as obtained from each discrete area in said predetermined pattern; and
   matrix oriented data compaction means receiving said discrete data streams and providing a compacted completely determinister output data stream representative of the total information on said major information surface.

2. The invention defined in claim 1, wherein said information means comprises an aperture card having information photographically recorded on said major information area;
   wherein said laser beam passes through said major information area; and
   wherein said detector and digitizing means includes a photoresponsive diode array behind the obverse surface of said information means in the path of said laser beam.

3. The invention defined in claim 1, wherein said laser scanner further includes data buffer means interconnecting said detecting and digitizing means and said data compaction means for receiving said plurality of discrete data streams and transmitting same to said data compaction means.

4. The invention defined in claim 3, wherein said data buffer means has a storage capacity of at least two of said discrete data streams to permit compaction of one such discrete data stream in said data compaction means while receiving another in said data buffer means.

5. The invention defined in claim 1, wherein said data compaction means comprises a matrix oriented vector compiler.

6. The invention defined in claim 2, wherein said data compaction means comprises a matrix oriented vector compiler.

7. The invention defined in claim 3, wherein said data compaction means comprises a matrix oriented vector compiler.

8. The invention defined in claim 4, wherein said data compaction means comprises a matrix oriented vector compiler.

* * * * *